(12) United States Patent
Hori

(10) Patent No.: US 6,637,876 B2
(45) Date of Patent: Oct. 28, 2003

(54) INK-JET PRINTER, INK CARTRIDGE FOR THE SAME

(75) Inventor: Takeshi Hori, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/142,850

(22) Filed: May 9, 2002

(65) Prior Publication Data

US 2003/0001922 A1 Jan. 2, 2003

(30) Foreign Application Priority Data

May 11, 2001 (JP) ........................... 2001-141315

(51) Int. Cl.7 ..................... G01D 11/00; C09D 11/00
(52) U.S. Cl. ................. 347/100; 106/31.27; 106/31.6
(58) Field of Search .................. 347/100; 106/31.13, 106/31.27, 31.6

(56) References Cited

FOREIGN PATENT DOCUMENTS

| EP | 913418 | * | 6/1999 |
|----|--------|---|--------|
| JP | A-Heisei 4-185452 | | 7/1992 |
| JP | a-Heisei 6-157959 | | 6/1994 |
| JP | 07173419 | * | 7/1995 |
| JP | A-Heisei 8-193177 | | 7/1996 |
| JP | A-Heisei 11-207999 | | 8/1999 |
| JP | P2000-238414 A | | 9/2000 |
| JP | 2002-512808 | * | 11/2000 |

* cited by examiner

*Primary Examiner*—Judy Nguyen
*Assistant Examiner*—Michael S Brooke
(74) *Attorney, Agent, or Firm*—Scully, Scott, Murphy & Presser

(57) ABSTRACT

An ink set is used in a bidirectional print, and each of first and second absorption quantity differences is equal to or less than 10 ml/m$^2$ in a contact time of 10 msec. in a dynamic scanning absorption meter. The first absorption quantity difference indicates difference between a absorption quantity when a first ink of the ink set is applied on a paper sheet on which a second ink of the ink set is applied and which is used for a print operation, and a absorption quantity when the first ink is applied on the paper sheet on which no ink is applied. The second absorption quantity difference indicates difference between an absorption quantity when the second ink is applied on the paper sheet on which the first ink is applied, and an absorption quantity when the second ink is applied on the paper sheet on which no ink is applied.

13 Claims, 1 Drawing Sheet

INK-JET PRINTER, INK CARTRIDGE FOR THE SAME

BACKGROUND OF THE INVENTION

1. Field of the Invention

The present invention relates to an ink-jet printer, and a recording method using the same, an ink cartridge used in the same, and ink-jet printer ink.

2. Description of the Related Art

Recently, the technical progress of a printer, especially, an ink-jet printer as a data output apparatus is remarkable with the wide use of a personal computer. Various type of ink-jet printers are marketed for various applications such as photograph quality and high-speed print like a laser printer.

Color ink cartridges and a black ink cartridge are generally prepared for the ink-jet printer. Thus, the print of a color image is possible, in addition to a monochromatic color print. In case of color print, the inks of three colors such as cyan, magenta and yellow are used as the color inks. Moreover, there is a case that ink of a light color is prepared in addition to these color inks. In any case, a plurality of color inks are generally piled, or layered, for color expression.

By the way, the demand of the bidirectional print has been rising recently for the improvement of the print speed. In a conventional ink-jet printer, a unidirectional print is adopted in which an ink-jet head is moved in a unidirection while ejecting ink drops. On the other hand, in the bidirectional print, the ejection of ink drops is carried out in a going way of the ink-jet head in a main scanning direction and a returning way in a direction opposite to the main scanning direction. In this case, almost twice of the print speed in the unidirectional print can be achieved in the bidirectional print.

However, the ink-jet head generally has the structure in which the ejecting nozzles of the cartridges of the colors of black, cyan, magenta and yellow are aligned on a line. Therefore, when the printer layers of two or more colors, a coloring difference develops, depending on whether the print head is traveling in the going way or the returning way.

For example, it is supposed an ink set is comprised of black and three colors of cyan, magenta and yellow. In this case, blue color is formed by adhesion of an ink drop of cyan and an ink drop of magenta. During operation, while the print head travels in the going direction, magenta contacts the paper prior to cyan. At the contact point, magenta, rather than cyan, primarily adheres to the paper. For this reason, the ink of cyan goes around the ink drop of magenta and then soaks into the paper sheet.

On the other hand, when creating a blue color in the returning way, the order of the ejection nozzles is opposite so that the ink drops are ejected in order of cyan and magenta. In this case, the ink drop of cyan is adhered on the surface of the paper sheet prior to the ink drop of magenta and stays on the surface of the paper sheet. For this reason, the ink of magenta goes around the ink drop of magenta and then soaks into the paper sheet.

In the two cases described above, the ink adhered earlier has the tendency to color strongly, creating what is referenced below as a "coloring difference." As a result, in the going way, the color of magenta is emphasized, and in the returning way, the color of cyan is emphasized.

Moreover, the coloring difference is more conspicuous in a print paper sheet with large quality deviation rather than glossy fine paper sheet in which the ink absorption is uniform and quick. The elimination of the coloring difference in the bidirectional print is demanded in the business use in addition to the high-speed print and the large-amount print.

In order to improve the above-mentioned problem, an ink-jet printer is proposed in which the inks are arranged in order of the colors of cyan, magenta, yellow, yellow, magenta, and cyan to the direction of the movement of the ink-jet head. In this conventional ink-jet printer, the ejection order of the inks is made identical in the going way and the returning way. However, the ink cartridges for the multiple colors have to be arranged symmetrically with respect of the center of a row of ink cartridges, like the described above. Therefore, the ink-jet head becomes large-sized, compared with the conventional ink-jet head that the ink-jet cartridges of cyan, magenta and yellow are arranged, resulting in cost-up.

Also, an ink-jet printer is disclosed in Japanese Laid Open Patent application (JP-A-Heisei 4-185452). In this reference, a printing operation is carried out in a going way, an ink-jet head is rotated by 180 degrees, and then the print operation is carried out in a returning way. In this method, the overall print time and structural size both increase.

As described above, various proposals were made for elimination of the coloring difference in the bidirectional print. However, because the structure of the printer is changed or the ejection method of inks is changed, it is difficult to incorporate the proposals in the existing printer.

In conjunction with the above description, ink and a recording method using it are disclosed in Japanese Laid Open Patent application (JP-A-Heisei 6-157959). In this reference, the ink is comprised of water, coloring material dispersed or soluble in the water, wetting agent, and 2-ethyl-1,3-hexanediol. A recording operation is carried out on a paper sheet with Steckigt sizing degree of 3 sec. or more with the ink.

Also, ink and a recording method are disclosed in Japanese Laid Open Patent Application (JP-A-Heisei 8-193177). The ink is comprised of (A) coloring agent, (B) penetrant selected from three of Monohydric alcohol, derivative of Polyhydric alcohol, and interfacial active agent equal to or less than micell concentration, (C) alginate, (D) at least one kind of interfacial active agent selected from fluoric interfacial active agent and silicon interfacial active agent with a value of expanse T shown below, (E) wetting agent and (F) water.

$$T=D/D0\times 100$$

where D is the diameter of a liquid drop of 0.05 wt % dropped on a paper sheet after 2 minutes, and D0 is the diameter of an ion exchange water drop dropped on a paper sheet after 2 minutes.

Also, ink and a recording method are disclosed in Japanese Laid Open Patent application (JP-A-Heisei 11-207999). In a recording head, a plurality of nozzles to eject inks are arranged to the direction sending a printed medium as a sub scanning direction. Also, a group of the nozzles is arranged in a print direction as a main scanning direction on the printed medium. The sub scanning is carried out between a going way and a returning way. For color mixture print, first color ink is ejected and then second color ink is ejected and a quantity of the second color ink is less than a quantity of the first color ink. However, it is necessary to provide an additional function to control the ejection quantities of the color inks, resulting in cost-up.

Also, an ink-jet recording medium is disclosed in of Japanese Laid Open Patent Application (JP-P2000-238414A). The ink-jet recording medium contains cationic resin in a range of cationic strength of 2 to 8 m equivalence/g as cationic residue equal to or more than 3 mmol/m$^2$. Also, the ink-jet recording medium has a transfer quantity of 30 ml/m2 of distilled water to the recording medium measured by a dynamic scan absorption meter in the contact time of 10 ms.

SUMMARY OF THE INVENTION

Therefore, an object of the present invention is to provide an ink-jet printer and a printing method, in which coloring difference in the bidirectional print can be eliminated without any additional structure and any control method.

Another object of the present invention is to provide an ink-jet printer and a printing method, in which high-speed bidirectional print is possible.

Still another object of the present invention is to provide an ink-jet printer ink cartridge and inks used in the above ink-jet printer and the printing method.

In an aspect of the present invention, an ink set is used in a bidirectional print, and each of first and second absorption quantity differences is equal to or less than 10 ml/m$^2$ in a contact time of 10 msec. in a dynamic scanning absorption meter. The first absorption quantity difference indicates difference between a absorption quantity when a first ink of the ink set is applied on a paper sheet on which a second ink of the ink set is applied and which is used for a print operation, and a absorption quantity when the first ink is applied on the paper sheet on which no ink is applied. The second absorption quantity difference indicates difference between an absorption quantity when the second ink is applied on the paper sheet on which the first ink is applied, and an absorption quantity when the second ink is applied on the paper sheet on which no ink is applied.

It is desirable that a time period from when the first ink is applied to when the second ink is applied or a time period from when the second ink is applied to when the first ink is applied is equal to or less than 30 sec.

Also, the ink may be dye-based ink. The dye-based ink may contain at least one kind of direct dye and acid dye, and the direct dye contains one selected from the group consisting of CI. direct yellow, CI. direct blue, CI. direct red, and the acid dye contains one selected from the group consisting of CI. acid yellow, CI. acid blue, CI. acid red.

Also, the ink may be pigment ink. An coloring material is selected from the group consisting of inorganic pigment, and insoluble Azo pigment, soluble Azo pigment, Phthalocyan pigment, Isoindolinon pigment, Quinacridorine pigment and Perylene pigment.

In this case, the coloring material is in a range of 1 to 10 wt % of a solid component of the ink.

Also, the ink may include solvent selected from the group consisting of ion exchange water, Alkyl alcohol ether with 1 to 4 carbons such as Methanol, Ethanol, N-propanol, Isopropanol, N-butanol, Sec-butanol, Tert-butanol, and Isobutanol, Amid such as Dimethylholmiamid and Dimethylaccetamid, Ketone or Ketoalcohol such as Acetone and Diacetone alcohol, ether such as Tetrahydrofuran and Dioxane, polyalkylene glycol such as Polyethylene glycol, and Polypropylene glycol, Alkylene glycol containing Alkylene group with 2 to 6 carbons such as Ethylene glycol, Propylene Glycol, 1, 2, 6-hexanetriol, Thiodiglycol, and Hexylene Glycol, and Lower alkyl ether of Polyhydric alcohol such as Glycerin, Ethylene Glycol methyl ether, Diethylene glycol monomethyl (monoethyl) ether, and Triethylene glycol monomethyl (monoethyl) ether.

Also, the ink may include agent selected from the group consisting of dispersion agent, interfacial active agent, viscosity conditioner, surface tension conditioner, pH conditioner, oxidation inhibitor, mildewproof agent, and chelating agent.

In another aspect of the present invention, an ink cartridge is for an ink-jet printer, and the ink cartridge is filled with one of an ink set used in a bidirectional print. Each of first and second absorption quantity differences is equal to or less than 10 ml/m$^2$ in a contact time of 10 msec. in a dynamic scanning absorption meter. The first absorption quantity difference indicates difference between a absorption quantity when a first ink of the ink set is applied on a paper sheet on which a second ink of the ink set is applied and which is used for a print operation, and an absorption quantity when the first ink is applied on the paper sheet on which no ink is applied. The second absorption quantity difference indicates difference between an absorption quantity when the second ink is applied on the paper sheet on which the first ink is applied, and an absorption quantity when the second ink is applied on the paper sheet on which no ink is applied.

It is desirable that a time period from when the first ink is applied to when the second ink is applied or a time period from when the second ink is applied to when the first ink is applied is equal to or less than 30 sec.

In still another aspect of the present invention, an ink-jet printer includes an ink-jet head with a plurality of ink cartridges, a drive section which drives the ink-jet head in a going way and a returning way; and a print control section which drives the ink-jet head based on print data such that ink drops are ejected from the plurality of ink cartridges. Each of the plurality of ink cartridges is filled with one of an ink set used in a bidirectional print, wherein each of first and second absorption quantity differences is equal to or less than 10 ml/m$^2$ in a contact time of 10 msec. in a dynamic scanning absorption meter. The first absorption quantity difference indicates difference between a absorption quantity when a first ink of the ink set is applied on a paper sheet on which a second ink of the ink set is applied and which is used for a print operation, and an absorption quantity when the first ink is applied on the paper sheet on which no ink is applied. The second absorption quantity difference indicates difference between an absorption quantity when the second ink is applied on the paper sheet on which the first ink is applied, and an absorption quantity when the second ink is applied on the paper sheet on which no ink is applied.

It is desirable that a time period from when the first ink is applied to when the second ink is applied or a time period from when the second ink is applied to when the first ink is applied is equal to or less than 30 sec.

In still another aspect of the present invention, a method of printing data by an ink-jet printer may be achieved by driving an ink-jet head in a going way and a returning way, the ink-jet head with a plurality of ink cartridges; and by driving the ink-jet head based on print data such that ink drops are ejected from the plurality of ink cartridges. Each of the plurality of ink cartridges is filled with one of an ink set used in a bidirectional print, wherein each of first and second absorption quantity differences is equal to or less than 10 ml/m$^2$ in a contact time of 10 msec. in a dynamic scanning absorption meter. The first absorption quantity difference indicates difference between a absorption quantity when a first ink of the ink set is applied on a paper sheet on which a second ink of the ink set is applied and which is used for a print operation, and a absorption quantity when the first ink is applied on the paper sheet on which no ink is applied. The second absorption quantity difference indicates difference between an absorption quantity when the second ink is applied on the paper sheet on which the first ink is applied, and an absorption quantity when the second ink is applied on the paper sheet on which no ink is applied.

It is desirable that a time period from when the first ink is applied to when the second ink is applied or a time period from when the second ink is applied to when the first ink is applied is equal to or less than 30 sec.

DESCRIPTION OF THE PREFERRED EMBODIMENTS

Figure 1:
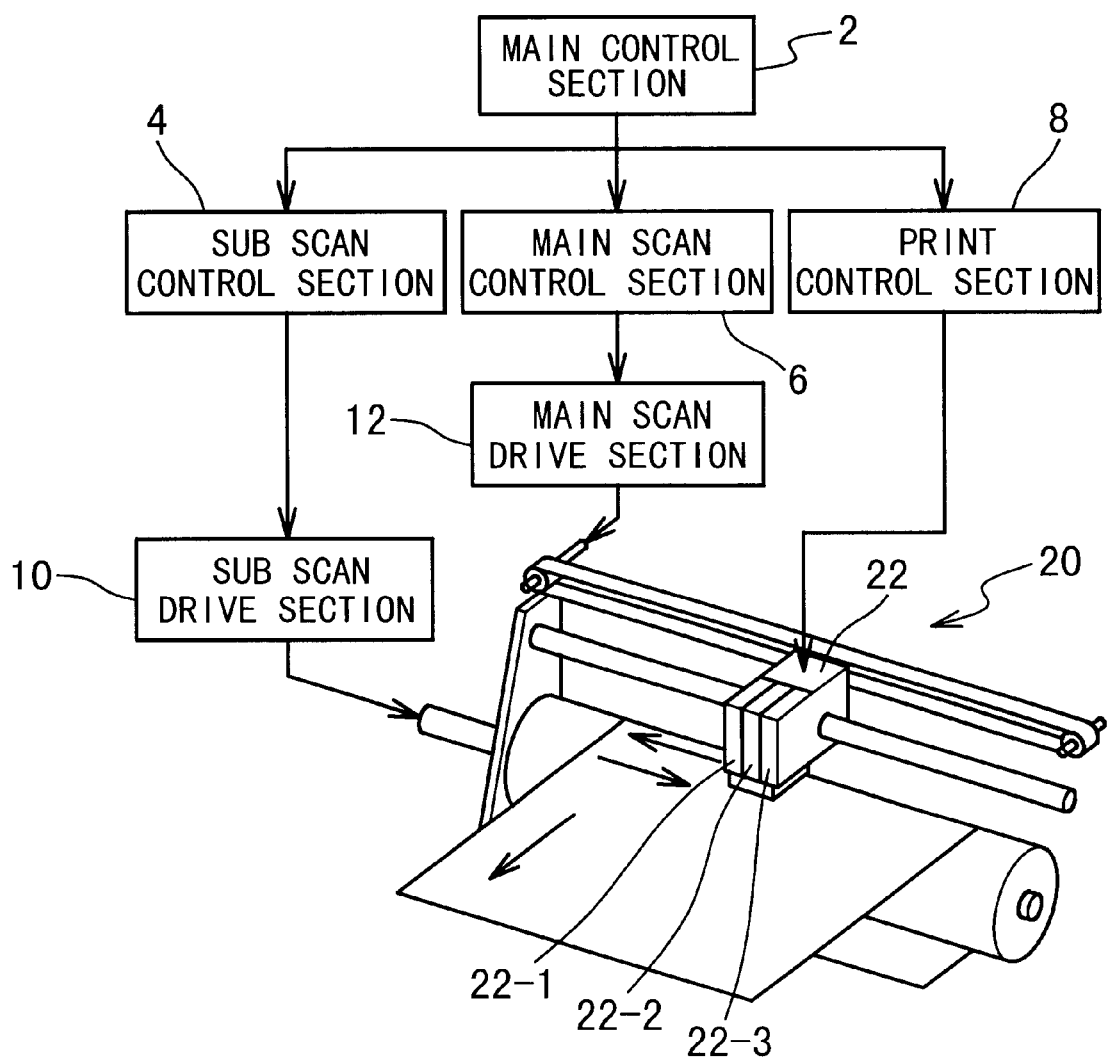
FIG. 1 is diagram showing an ink-jet printer and a control system.

Hereinafter, an ink-jet printer using ink cartridges containing inks of the present invention will be described in detail with reference to the attached drawings.

To solve the above coloring difference in the bidirectional print, the inventor of the present invention carried out an experiment about absorption of ink b when an ink drop b was ejected on a paper sheet which has absorbed an ink a, and absorption of the ink a when the ink drop a was ejected on the paper sheet which has absorbed the ink b. Consequently, it was found that there was a case that the absorption of the ink b is large or same in the paper sheet having absorbed the ink a, compared with the absorption of the ink b in the paper sheet having absorbed no ink. The same thing is true about the absorption of the ink a in the paper sheet having absorbed the ink b and the paper sheet having absorbed no ink. Also, it was found that the variance in the absorption of ink sometimes depended on the adhesion order of inks and sometimes did not depend on it. Moreover, it was found that difference in the absorption strongly depended on the combination of the paper sheet and the inks a and b.

As a result, no appreciable coloring difference was measured in the bi-directional print. Specifically, paper was layered with ink a and then ink b. The same paper type was layered with only ink b. In this test, no appreciable absorption difference was detected with respect to ink b. Furthermore, paper was layered with ink b and then ink a. The same paper type was layered with only ink a. In this test, no appreciable absorption difference was detected with respect to ink a.

As an example, a case that a blue color is produced will be described. The ink of magenta is first adhered to and absorbed in a paper sheet influences to the absorption of the ink of cyan in many cases. The reverse order of ink injection, and thus absorption influence occurs in the return direction. Accordingly, a combination of the ink of cyan and the ink of magenta is essential to prevent the coloring difference in the bi-directional print. In this combination, the ink of magenta is absorbed in the paper sheet as if the ink of cyan is not present even if the ink of cyan is present in the paper sheet, and the ink of cyan is absorbed in the paper sheet as if the ink of magenta is not present even if the ink of magenta is present in the paper sheet.

Hereinafter, the present invention will be described more specifically.

The absorption of ink in a paper sheet, which is important in the present invention, is represented in a concept of "sizing degree" in many cases. Methods such as a Steckigt method and a Bristow method are conventionally known for the evaluation of the sizing degree.

Of these methods, the Bristow method is a paper standard testing method in Japan. However, it was difficult to apply the Bristow method to the evaluation of the absorption of ink in an ink-jet printer, for the reasons that the method took a long time, and requires a large size of a test paper sheet piece. Especially, the method could not measure the speedy absorption of ink as in the ink-jet printer.

It is possible to measure a correct absorption quantity of water in a short time in a dynamic scanning absorption meter (Japan TAPPI journal, Vol. 48, No. 5, page. 88), in which the above evaluation method is improved. In the absorption meter, a turntable can be turned around an axis and moved along the axis. The absorption meter can measure an ink absorption quantity by pushing a capillary containing an ink as a test object against a test piece of a paper sheet on the turntable while the test piece is spirally scanned, and by optically measuring a consumed ink quantity by a sensor. In the present invention, a dynamic scanning absorption meter (KM350-D1) commercially available from KYOWA SEIKO in Japan. The absorption meter has a first single capillary. In the present invention, a second capillary is added such that an ink from the second capillary overlaps on an ink line spirally drawn on a test piece of a paper sheet by an ink from the first capillary. The ink absorption quantity sensor is connected to the second capillary. Through this addition of the second capillary, it becomes possible to measure the absorption quantity of only the ink a and the absorption quantity of the ink b in the state in which the ink a is applied. Also, if the ink a and the ink b in the first and second capillaries are replaced, it becomes possible to measure the absorption quantity of only the ink b and the absorption quantity of the ink a in the state in which the ink b is applied. Also, by adjusting the distance between the first and second capillaries, the time period from when the ink a or b is ejected on the test piece to when the ink b or a is ejected on the test piece can be freely controlled.

Instead of applying the first ink supplied from the first capillary on the paper sheet, the ink may be coated on the paper sheet with a wire bar, the paper sheet may be sunk in the ink, or the ink may be actually adhered by a printer. Thus, the above ink absorption quantity may be measured.

The method of using two capillaries to apply inks imitates the situation which the ink b (or a) is applied immediately after the ink a (or b) is applied on a test piece. This method corresponds to an ink-jet printer with a short time between the going way and the returning way, i.e., a high-speed ink-jet printer of the present invention. Therefore, it is preferable that the time period from when the ink a (or b) is ejected from the first capillary to when the ink b (or a) is ejected from the second capillary is within 30 seconds. More preferably, it is within 10 seconds.

The following two matters were measured by using the above method:

Difference of the absorption quantity of the ink a when the ink a was applied in the state in which no ink was applied on a test piece, and the absorption quantity of the ink a when the ink a was applied in the state in which the ink b was applied on the test piece; and difference of the absorption quantity of the ink b when the ink b was applied in the state in which no ink was applied on the test piece, and the absorption quantity of the ink b when the ink b was applied in the state in which the ink a was applied on the test piece.

Next, available ink will be described. The present invention can be applied to either of dye based ink and pigment ink. The dye based ink contains at least one kind of direct dye and acid dye as coloring material. The direct dye contains CI. direct yellow, CI. direct blue, CI. direct red and so on. The acid dye contains CI. acid yellow, CI. acid blue, CI. acid red and so on.

As the coloring material of the pigment ink, materials can be used such as inorganic pigment, organic pigment (insoluble Azo pigment, soluble Azo pigment, phthalocyan pigment, Isoindolinon pigment, Quinacridorine pigment and Perylene pigment), for example. Also, processed pigment whose surface is processed with the solvent can be used. The containing quantity of the coloring material in the ink is preferably in a range of 1 to 10 wt % of a solid component, taking the stability of the ink, the depth of the print image, the blockage of the ink from a nozzle, and the spouting property into account.

Also, as solvent for ink-jet printer ink, water-soluble organic solvent is exemplified in addition to ion exchange water. For example, the solvent can be used such as Alkyl alcohol ether with 1 to 4 carbons such as Methanol, Ethanol, N-propanol, Isopropanol, N-butanol, Sec-butanol, Tert-butanol, and Isobutanol, amid such as Dimethylholmiamid and Dimethylaccetamid, Ketone or Ketoalcohol such as Acetone and Diacetone alcohol, ether such as Tetrahydrofuran and Dioxane, polyalkylene glycol such as Polyethylene glycol, and Polypropylene glycol, alkylene glycol containing alkylene group with 2 to 6 carbons such as Ethylene glycol, Propylene glycol, 1, 2, 6-hexanetriol, Thiodiglycol, and Hexylene glycol, and lower alkyl ether of polyhydric alcohol such as Glycerin, Ethylene glycol methyl ether, Diethylene glycol monomethyl (monoethyl) ether, and Triethylene glycol monomethyl (monoethyl) ether.

In addition, agents such as dispersion agent, interfacial active agent, viscosity conditioner, surface tension conditioner, pH conditioner, oxidation inhibitor, mildew-proof agent, and chelating agent may be added according to need.

Also, in the present invention, the L paper commercially available from Xerox was used as ink absorption paper. The ink absorption characteristic of the print paper was so far described. This is because it can be considered that print paper would be used for the high-speed print in the bidirectional printing system. The present invention can be applied widely in the practical use. The paper to be used is not limited to the print paper.

The inks a to e having the following compositions were produced from the above-mentioned ink materials. The difference in the above-mentioned absorption quantity between two of these inks, e.g., the inks a and b was measured when the contact time of the dynamic liquid absorption meter was 10 ms.

Moreover, "drawing patches" were printed in a "fine mode" of an ink-jet printer (MJ-520) of SEIKO EPSON by exchanging ink cartridges such that the ink a was coated on the ink b and the ink b was coated on the ink a. Then, $L^*a^*b^*3$ color values were measured in the condition of light source of D65, and the visual field angle of 2°, using Spectrolino of GretagMacbeth Inc., and the coloring difference $\Delta E$ between them was determined as a reference value. Here, the coloring differences were grouped into three groups. That is, the symbol ○ indicates $\Delta E<2$, the symbol $\Delta$ indicates $2 \leq \Delta E \leq 3$, and the symbol X indicates $3<\Delta E$.

The produced inks are as follows.

(Composition of the ink a)

| | |
|---|---|
| CI. direct blue 199 | 3.0 wt % |
| triethylene glycol monobutyl ether | 10 wt % |
| Olfin E1010 (commercially available from Nisshin Chemical) | 0.2 wt % |
| Diethylene glycol | 11 wt % |
| Antiseptic agent | 0.3 wt % |
| ion exchange water | remaining component |

(Composition of the ink b)

| | |
|---|---|
| CI. direct blue 199 | 3.5 wt % |
| diethylene glycol monobutyl ether | 5 wt % |
| Nissan Nymiean L-207 (commercially available from Nihon Yushi) | 0.2 wt % |
| Glycerin | 15 wt % |
| Antiseptic agent | 0.3 wt % |
| ion exchange water | remaining component |

(Composition of the ink c)

| | |
|---|---|
| CI. direct red 289 | 2.0 wt % |
| Triethylene glycol monobutyl ether | 3 wt % |
| Olfin E1010 (commercially available from Nisshin Chemical) | 0.2 wt % |
| Diethylene glycol | 14 wt % |
| antiseptic agent | 0.3 wt % |
| ion exchange water | remaining component |

(Composition of the ink d)

| | |
|---|---|
| CI. direct red 227 | 3.5 wt % |
| Diethylene glycol monobutyl ether | 5 wt % |
| Dynol 604 (commercially available from Air Product) | 0.02 wt % |

-continued

| The produced inks are as follows. | |
|---|---|
| Glycerin | 15 wt % |
| Antiseptic agent | 0.3 wt % |
| ion exchange water | remaining component |
| (Composition of the ink e) | |
| CI. direct yellow | 2.5 wt % |
| Triethylene glycol monobutyl ether | 8 wt % |
| Olfin E1010 (commercially available from Nisshin Chemical) | 0.4 wt % |
| Glycerin | 15 wt % |
| antiseptic agent | 0.3 wt % |
| ion exchange water | remaining component |

It should be noted that the above inks are conditioned to have surface tension of approximately 31–35 (dyn/cm) by adjusting the addition quantity of the interfacial active agent. The table 1 shows the test result.

TABLE 1

| ink set | | ←absorption quantity difference | →absorption quantity difference | coloring difference |
|---|---|---|---|---|
| (a) | (b) | 3.4 | 12.4 | Δ |
|  | (c) | 10.5 | 4.8 | Δ |
|  | (d) | 5.2 | 8.2 | ○ |
|  | (e) | 15.8 | 15.7 | x |
| (b) | (c) | 10.6 | 23.5 | x |
|  | (d) | 3.8 | 3.2 | ○ |
|  | (e) | 17.8 | 6.8 | Δ |
| (c) | (d) | 5.6 | 13.5 | Δ |
|  | (e) | 3.3 | 6.4 | ○ |
| (d) | (e) | 10.7 | 12.4 | x |

Here, the difference in absorption quantity is a value when the contact time of the dynamic liquid absorption meter is 10 mS, and the unit is (ml/m2).

Also, the column of "← absorption quantity difference" indicates an absorption quantity difference relating to the ink written in the left column of the ink set, in other words, the difference between the absorption quantity of the ink when only the ink written in the left column of the ink set is applied, and an absorption quantity of the ink when the ink written in the left column of the ink set is applied in the condition that the ink written in the right column of the ink set is applied on the paper sheet. Also, the column of "→ absorption quantity difference" is the absorption quantity difference relating to the ink written in the right column of the ink set, in other words, the difference between the absorption quantity of the ink when only the ink written in the right column of the ink set was applied, and an absorption quantity of the ink when the ink written in the right column of the ink set is applied in the condition that the ink written in the left column of the ink set is applied on the paper sheet.

For example, "← absorption quantity difference" of 3.4 in the first row of the table indicates a value (an absolute value) obtained by subtracting the absorption quantity of the ink a when the ink a is applied on an original paper sheet from the absorption quantity of the ink a when the ink a is applied on the paper sheet on which the ink b has been previously applied. Also, "→ absorption quantity" of 12.4 indicates a value (an absolute value) obtained by subtracting the absorption quantity of the ink b when the ink b is applied on an original paper sheet from the absorption quantity of the ink b when the ink b is applied on the paper sheet on which the ink a has been previously applied. At this time, the coloring difference between them is consequently determined to be Δ based on the criterion.

From the above result, it could be understood that the coloring difference in the bidirectional print is small in the ink set that the difference in the absorption quantity is both equal to or less than 10 (ml/m2).

As described above, only the ink sets of the limited combination of colors are described in the embodiments of the present invention. However, the present invention is not essentially limited to these colors and the inks. For example, the present invention can apply in a case where the black color is formed by mixing colors of cyan, magenta, and yellow without using independent black ink. Besides, the scope of the present invention is not limited to the embodiments of the present invention.

Next, the ink-jet printer of the present invention will be described.

Referring to FIG. 1, the ink-jet printer is comprised of a main control section 2, a sub scan control section 4, a main scan control section 6, a print control section 8, a sub scan drive section 10, a main scan drive section 12, and a ink-jet head 20. The ink-jet head 20 is comprised of a print drive section 22, and 3-color ink cartridges 22-1 to 22-3. The main control section 2 controls the operation of the ink-jet printer. The sub scan control section 4 controls the sub scan drive section 10 to feed a print paper sheet. The main scan control section 6 controls the main scan drive section 10 to move the ink-jet head in a direction of a going way and a direction of a returning way. The print control section 8 controls the ink-jet head 20 in such a manner that ink drops are ejected from the ink cartridges 22-1 to 22-3 to the print paper sheet. The color inks of the present invention are filled in the ink cartridges 22-1 to 22-3. In this way, the bidirectional color print can be achieved.

According to the present invention, the coloring difference dependent on the difference of the piling order of the colors can be eliminated. The coloring problem can be solved without adopting a special structure in the printer and control of ejecting operation of the inks. In this way, the bi-directional print can be accomplished with low price, the high-speed operation and the high quality in the present invention.

What is claimed is:

1. An ink set used in bi-directional printing, having a first and second absorption quantity differences, wherein each of first and second absorption quantity differences are equal to or less than 10 ml/m$^2$ in a contact time of 10 msec. in a dynamic scanning absorption meter, said first absorption quantity difference indicates a difference between an absorption quantity when a first ink of said ink set is applied on a paper sheet on which a second ink of said ink set is applied and which is used for a print operation, and an absorption quantity when said first ink is applied on said paper sheet on which no other ink is applied, and said second absorption quantity difference indicates a difference between an absorption quantity when said second ink is applied on said paper sheet on which said first ink is applied, and an absorption quantity when said second ink is applied on said paper sheet on which no other ink is applied.

2. An ink set according to claim 1, wherein a time period from when said first ink is applied to when said second ink is applied or a time period from when said second ink is applied to when said first ink is applied is equal to or less than 30 sec.

3. An ink set according to claim 1, wherein each ink of said ink set is dye-based ink, and said dye-based ink contains at least one kind of direct dye and acid dye, and said direct dye contains one selected from the group consisting of CI. direct yellow, CI. direct blue, CI. direct red, and said acid dye contains one selected from the group consisting of CI. acid yellow, CI. acid blue, CI. acid red.

4. An ink set according to claim 3, wherein each ink of said ink set includes solvent selected from the group consisting of ion exchange water, Alkyl alcohol ether with 1 to 4 carbons such as Methanol, Ethanol, N-propanol, Isopropanol, N-butanol, Sec-butanol, Tert-butanol, and Isobutanol, amid such as Dimethylholmiamid and Dimethylaccetamid, ketone or ketoalcohol such as Acetone and Diacetone alcohol, ether such as Tetrahydrofuran and Dioxane, polyalkylene glycol such as Polyethylene glycol, and Polypropylene glycol, alkylene glycol containing alkylene group with 2 to 6 carbons such as Ethylene glycol, Propylene glycol, 1, 2, 6-hexanetriol, Thiodiglycol, and Hexylene glycol, and lower alkyl ether of polyhydric alcohol such as Glycerin, Ethylene glycol methyl ether, Diethylene glycol monomethyl (monoethyl) ether, and Triethylene glycol monomethyl (monoethyl) ether.

5. An ink set according to claim 3, wherein each ink of said ink set includes agent selected from the group consisting of dispersion agent, interfacial active agents viscosity conditioner, surface tension conditioner, pH conditioner, oxidation inhibitor, mildewproof agent, and chelating agent.

6. An ink set according to claim 1, wherein each ink of said ink set is pigment ink, an coloring material is selected from the group consisting of inorganic pigment, and insoluble azo pigment, soluble Azo pigment, Phthalocyan pigment, Isoindolinon pigment, Quinacridorine pigment and Perylene pigment.

7. An ink set according to claim 6, wherein said coloring material is in a range of 1 to 10 wt % of a solid component of each ink of said ink set.

8. A plurality of ink jet cartridges for an ink jet printer, wherein each of said cartridges is filled with one of an ink set used in a bi-directional printing, having first and second absorption quantities, wherein each of first and second absorption quantity differences are equal to or less than 10 ml/m$^2$ in a contact time of 10 msec. in a dynamic scanning absorption meter, said first absorption quantity difference indicates a difference between an absorption quantity when a first ink of said ink set is applied on a paper sheet on which a second ink of said ink set is applied and which is used for a print operation, and an absorption quantity when said first ink is applied on said paper sheet on which no other ink is applied, and said second absorption quantity difference indicates a difference between an absorption quantity when said second ink is applied on said paper sheet on which said first ink is applied, and an absorption quantity when said second ink is applied on said paper sheet on which no other ink is applied.

9. The ink cartridge according to claim 8, wherein a time period from when said first ink is applied to when said second ink is applied or a time period from when said second ink is applied to when said first ink is applied is equal to or less than 30 sec.

10. An ink-jet printer comprising:

an ink-jet head with a plurality of ink cartridges;

a drive section which drives said ink-jet head in a going way and a returning way; and a print control section which drives said ink-jet head based on print data such that ink drops are ejected from said plurality of ink cartridges, and wherein each of said cartridges is filled with one ink of an ink set used in bi-directional printing, having first and second absorption quantities, wherein each of first and second absorption quantity differences are equal to or less than 10 ml/m$^2$ in a contact time of 10 msec. in a dynamic scanning absorption meter, said first absorption quantity difference indicates difference between an absorption quantity when a first ink of said ink set is applied on a paper sheet on which a second ink of said ink set is applied and which is used for a print operation, and an absorption quantity when said first ink is applied on said paper sheet on which no other ink is applied, and said second absorption quantity difference indicates a difference between an absorption quantity when said second ink is applied on said paper sheet on which said first ink is applied, and an absorption quantity when said second ink is applied on said paper sheet on which no other ink is applied.

11. The ink-jet printer according to claim 10, wherein a time period from when said first ink is applied to when said second ink is applied or a time period from when said second ink is applied to when said first ink is applied is equal to or less than 30 sec.

12. A method of printing data by an ink-jet printer comprising the step of:

driving an ink-jet head in a going way and a returning way, said ink-jet head with a plurality of ink cartridges; and driving said ink-jet head based on print data such that ink drops are ejected from said plurality of ink cartridges, and wherein each of said plurality of ink cartridges is filled with one of an ink set used in bi-directional printing, having first and second absorption quantities, wherein each of first and second absorption quantity differences are equal to or less than 10 ml/m$^2$ in a contact time of 10 msec. in a dynamic scanning absorption meter, said first absorption quantity difference indicates a difference between an absorption quantity when a first ink of said ink set is applied on a paper sheet on which a second ink of said ink set is applied and which is used for a print operation, and an absorption quantity when said first ink is applied on said paper sheet on which no other ink is applied, and said second absorption quantity difference indicates a difference between an absorption quantity when said second ink is applied on said paper sheet on which said first ink is applied, and an absorption quantity when said second ink is applied on said paper sheet on which no other ink is applied.

13. The method according to claim 12, wherein a time period from when said first ink is applied to when said second ink is applied or a time period from when said second ink is applied to when said first ink is applied is equal to or less than 30 sec.

* * * * *